(12) United States Patent
Soldan et al.

(10) Patent No.: US 8,549,397 B2
(45) Date of Patent: *Oct. 1, 2013

(54) HIERARCHICAL BIT STREAM MARKUP COMPILATION AND RENDERING

(75) Inventors: Eric R. Soldan, Saratoga, CA (US); Steven J. Falkenburg, Los Altos, CA (US); Tantek Celik, San Francisco, CA (US); Bradley R. Pettit, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 566 days.

This patent is subject to a terminal disclaimer.

(21) Appl. No.: 12/617,868

(22) Filed: Nov. 13, 2009

(65) Prior Publication Data
US 2010/0058172 A1 Mar. 4, 2010

Related U.S. Application Data

(62) Division of application No. 10/759,445, filed on Jan. 14, 2004, now Pat. No. 7,627,814.

(51) Int. Cl.
*G06F 17/00* (2006.01)
(52) U.S. Cl.
USPC ........... 715/236; 715/238; 715/249; 715/264; 715/242
(58) Field of Classification Search
USPC ................ 715/234, 236, 238, 249, 264, 242
See application file for complete search history.

(56) References Cited

U.S. PATENT DOCUMENTS

| | | | |
|---|---|---|---|
| 6,613,098 B1 * | 9/2003 | Sorge et al. | 715/234 |
| 6,623,529 B1 | 9/2003 | Lakritz | |
| 2001/0044809 A1 | 11/2001 | Parasnis et al. | |
| 2003/0046317 A1 | 3/2003 | Cseri et al. | |
| 2004/0006741 A1 | 1/2004 | Radja et al. | |
| 2004/0133855 A1 | 7/2004 | Blair et al. | |
| 2004/0148571 A1 * | 7/2004 | Lue | 715/514 |
| 2005/0044499 A1 | 2/2005 | Allen et al. | |
| 2005/0204337 A1 | 9/2005 | Diesel et al. | |
| 2008/0005247 A9 | 1/2008 | Khoo | |

OTHER PUBLICATIONS

"CSS Pseudo-Classes", retrieved on Apr. 15, 2008 at <<http://www.w3schools.com/CSS/css_pseudo_classes.asp?output=print>>, W3Schools.com, archived Dec. 21, 2002, 5 pg.
"New Features in Internet Explorer 5", Nov. 14, 2003, retrieved Nov. 24, 2008 at <<http://web.archive.org/web/20041102082445/http://support.microsoft.com/kb/221787>>, 3 pgs.

* cited by examiner

*Primary Examiner* — Adam M Queler
(74) *Attorney, Agent, or Firm* — Lee & Hayes, PLLC

(57) ABSTRACT

Video content in an original markup language is processed and distributed for presentation such that the presentation preserves static and dynamic aspects of the video content in the original markup language. The video content in the original markup language may be processed into a binary format using a client-specific routine that is specific to a predetermined client. The distributed video content may be presented in a way that preserves the static and dynamic aspects of the video content in the original markup language.

20 Claims, 9 Drawing Sheets

HIERARCHICAL BIT STREAM MARKUP COMPILATION AND RENDERING

CROSS-REFERENCE TO RELATED APPLICATIONS

This US Non-Provisional Application is a divisional application of U.S. application Ser. No. 10/759,445, filed Jan. 14, 2004, which is incorporated herein by reference.

TECHNICAL FIELD

This invention relates to the rendering of content authored in a complex markup language on a small resource device, and more particularly to its rendering using corresponding compiled serialized data that provides for dynamic layout, presentation, rendering, and user interface interaction of the content on the small resource device.

BACKGROUND

Content delivered over networks can be feature rich when rendered on the browser of a client, largely due to the rich capabilities built into complex markup languages, such as eXtensible Hypertext Markup Language (XHTML) and Cascading Style Sheets (CSS). XHTML, which is a markup language written in eXtensible Markup Language (XML), is an XML application. XHTML, which is HTML re-cast in XML syntax, is specifically designed for Internet device displays. XHTML uses XML namespaces. These XML namespaces are used to qualify element and attributes names by associating them with namespaces identified by Universal Resource Identifier (URI) references. Namespaces prevent identically custom-named tags that may be used in different XML documents from being interpreted the same. The specific syntax rules for an XML document, describing the tags and attributes allowed and the context in which they're allowed, are defined in the schema associated with the XML document. Schemas can be described by several means, including Document Type Definitions (DTDs) or XML Schema (XSD). Three common DTDs for XHTML family documents are strict, transitional, and frameset. An XHTML family conforming document will specify one of these schemas, or possibly a custom schema, and will associate all XHTML tags within that document with the XHTML namespace URI. These and other standards relative to XML, XHTML, and CSS are documented by the World Wide Web Consortium (W3C).

Valid XHTML markup must conform to the markup standards defined in an HTML schema (typically stored in a DTD or XSD file). In order to allow for extending XHTML for various applications and platforms, XHTML may go through a modularization process. A device designer, using standard building blocks, will specify which elements and attributes are supported. Content creators will then target these building blocks—or modules. Custom modules may be authored and added to a modularization to extend its capabilities for a particular application. A minimal subset of standard modules is required to be supported in order for a schema to be classified as an XHTML family. Because of this, a certain minimal bar of interoperability between different modularizations of XHTML is maintained.

Cascading Style Sheets (CSS) is a commonly supported styling language. CSS, for instance, can give both Web site developers and users more control over how web pages are displayed. With CSS, designers and users can create style sheets that define how different elements appear, such as headers and links. The style sheets also include typographical information on how the page should appear, such as the font of the text in the page. These style sheets can then be applied to any Web page. An XHTML (or other XML) document may reference a stylesheet explicitly. Additionally, an XHTML schema typically implicitly includes a CSS style sheet to define a default set of styles for the tags and attributes included in that schema. The term cascading derives from the fact that multiple styles may be combined deeply, or cascaded, to define the style for an element on a page. CSS and XHTML were developed by the W3C. Both XHTML and CSS are described at length in their respective governing specifications provided by the World Wide Web Consortium (W3C). A common computing device, such as a personal computer (PC), executes a browser application to render content that is expressed as CSS-styled XHTML, referred to herein as "XHTML+CSS".

While a typical PC has sufficient resources to readily render XHTML+CSS using its browser, a computing device having considerably less memory and/or processor capacity can experience severe performance degradation in processing such content. Accordingly, there is an exemplary need in the art for techniques to transform content in an original complex markup language for rendering at a small resource computing device, where the transformation maintains much of the richness of the original complex markup language to allow the content to remain dynamic in nature.

SUMMARY

According to one exemplary implementation, a method is described for distributing video content. An original markup language of the video content may include layout, rendering, user interface (UI) interaction, and dynamic aspects. The video content in the original markup language may be processed into a binary format using a markup-specific routine that is specific to the original markup language and a client-specific routine that is specific to a predetermined client. The processed video content may be communicated to a client.

The processing of the video content into the binary format may utilize a Document Object Model (DOM) to further form a DOM hierarchy corresponding to the video content of the original markup language. The video content may be presented at the client using the DOM hierarchy so as to maintain the layout, rendering, UI interaction, and dynamic aspects of the video content from the original markup language. As such, the presentation may include form elements, scrolling, navigation, and event handling defined in the video content from the original markup language.

Related apparatus, system, and computer-readable media are also described herein.

Figure 1:
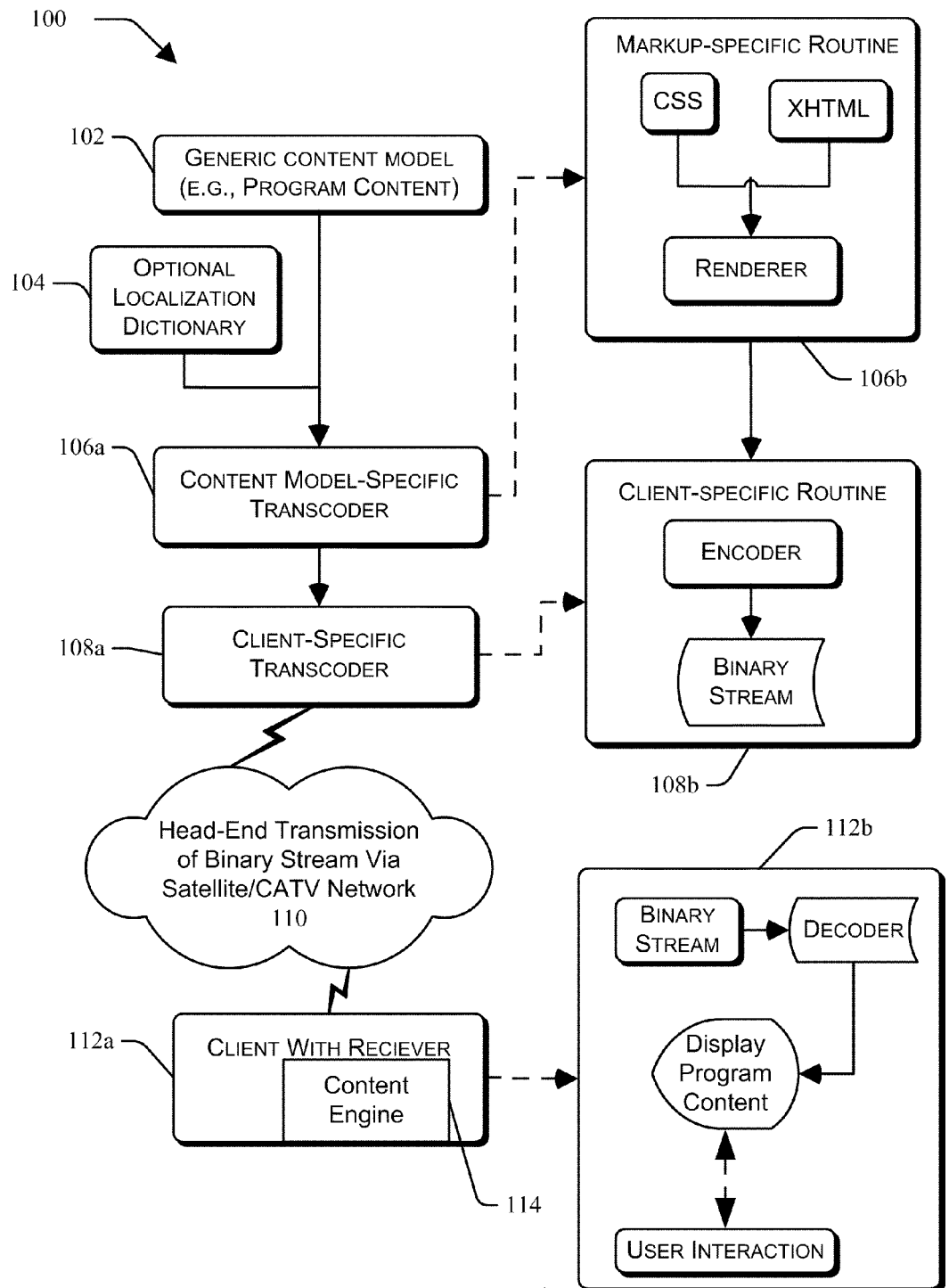
FIG. 1 shows an exemplary process for compiling content expressed in a generic content model using a markup-specific routine that is specific to the generic content model and using a client-specific routine that is specific to a particular low-resource client. The client-specific routine may form serialized binary data that can be rendered at the low-resource client so as to preserve the richness of the content expressed in the generic content model.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to distributing video content. The video content may be processed into a binary format prior to distribution. The processing may preserve elements of the video content such as layout, rendering, user interface (UI) interaction, and dynamic aspects of the formatted video content such that a presentation of the distributed video content preserves such elements. Video content, as used herein, refers to visual subject matter, such as slides in a slide show, motion or moving pictures, a spreadsheet that can be graphically depicted, a drawing, a television program, etc.

This disclosure also pertains to the rendering of distributed video content. To provide a concrete framework for discussion, this disclosure will specifically describe the transformation of hierarchically organized data expressed in a markup language into a serialized binary bit stream that can be visually rendered and interacted with by an end user through a user interface (UI). An exemplary markup language is XHTML+CSS. However, the concepts described herein also have application to content expressed in other mark-up languages and content models. Exemplary client devices upon which the UI is displayed can include, but are not limited to, a set-top box, a personal computer, a video game console, an automatic teller machine, and a cellular telephone. For example, at present, most set top boxes (STB) can be described as a low-resource computing device with respect to the resources of a typical personal computer.

An exemplary implementation executes on a STB that is at least order of magnitude less powerful with respect to processor and/or memory than a typical desktop machine which presently has processor power of about 1 or more GHz and memory power of about 256 or more MB. In another exemplary implementation, a low resource client has a processor with a clock speed of less than or equal to one-hundred (100) MHz and has memory that is less than or equal to five (5) megabytes.

This disclosure is organized as follows. Section A of this disclosure describes an exemplary process for compiling content expressed in a generic content model using a markup-specific routine that is specific to the generic content model and using a client-specific routine that is specific to a particular low-resource client, where the client-specific routine forms serialized binary data that can be rendered at the low-resource client so as to preserve the richness of the content expressed in the generic content model. Section B describes an exemplary implementation of the process discussed in Section A, and a Section C describes an exemplary computing environment that can be used to provide the implementation described in Section B.

A. Exemplary Compilation and Reconstitution Process

An exemplary process 100 is seen in FIG. 1 for compiling content (e.g., program content) expressed in a generic content model 102. The generic content model 102, with an optional localization dictionary 104 useable to translate words in the generic content model 102 into other languages, is submitted at block 106a to a content model-specific transcoder. Localization dictionary 104 that is be used to translate one or more textual words into a plurality of languages (e.g.; Japanese, Mandarin, Spanish, German, English, etc.) can be included in the content. In a broader sense, however, original content in forms other than text can also be transformed for the content. For instance, a slideshow file, such as can be created using the PowerPoint® software of Microsoft Corporation of Redmond, Wash., can have one or more images therein (e.g., test, inline images, graphics, etc.) that can be converted or transformed into one or more formats using implementations disclosed herein. In this case, the slideshow file may contain images and little or no text. Original content in formats include word processing document formats, spreadsheet formats, database formats, drawing formats, electronic mail (email) formats, etc.

Transcoding is performed by a transcoder at block 106a is represented by a markup-specific routine 106b. The markup-specific routine 106b, which is compatible with the specific generic content model 102, processes CSS and XHTML for a renderer. Given the foregoing examples, the markup-specific routine 106b could be specific to text, specific to a slideshow file, or specific to another form of content. The markup-specific routine at block 106b prepares output from the renderer for processing at a block 108a which is represented in FIG. 1 as a client-specific transcoder 108a. The transcoding by a transcoder of the client-specific transcoder 108a is represented by a client-specific routine at block 108b. The client-specific routine 108b, which is specific to a particular low-resource client represented by a block 112a in FIG. 1, encodes the output of the renderer at block 106b to output a serialized binary stream. The serialized binary data is transmitted by a head-end in a transmission over a satellite/Cable TV (CATV) network 110 for rendering by the low-resource client at block 112a. At block 112a, a content engine routine executes that is represented by a block 112b. Block 112b uses a decoder to decode the serialized binary data that is received by a receiver of the low-resource client in the transmission from the head-end. The decoded content from the transmission, as depicted by block 112b, can be displayed on a display device for subsequent user interaction. The content and configuration of the decoded deserialized binary data, when processed and rendered by the content engine 114 at the low source client 112a, preserves in the rendering the richness of the content expressed in the generic content model 102.

Figure 2:
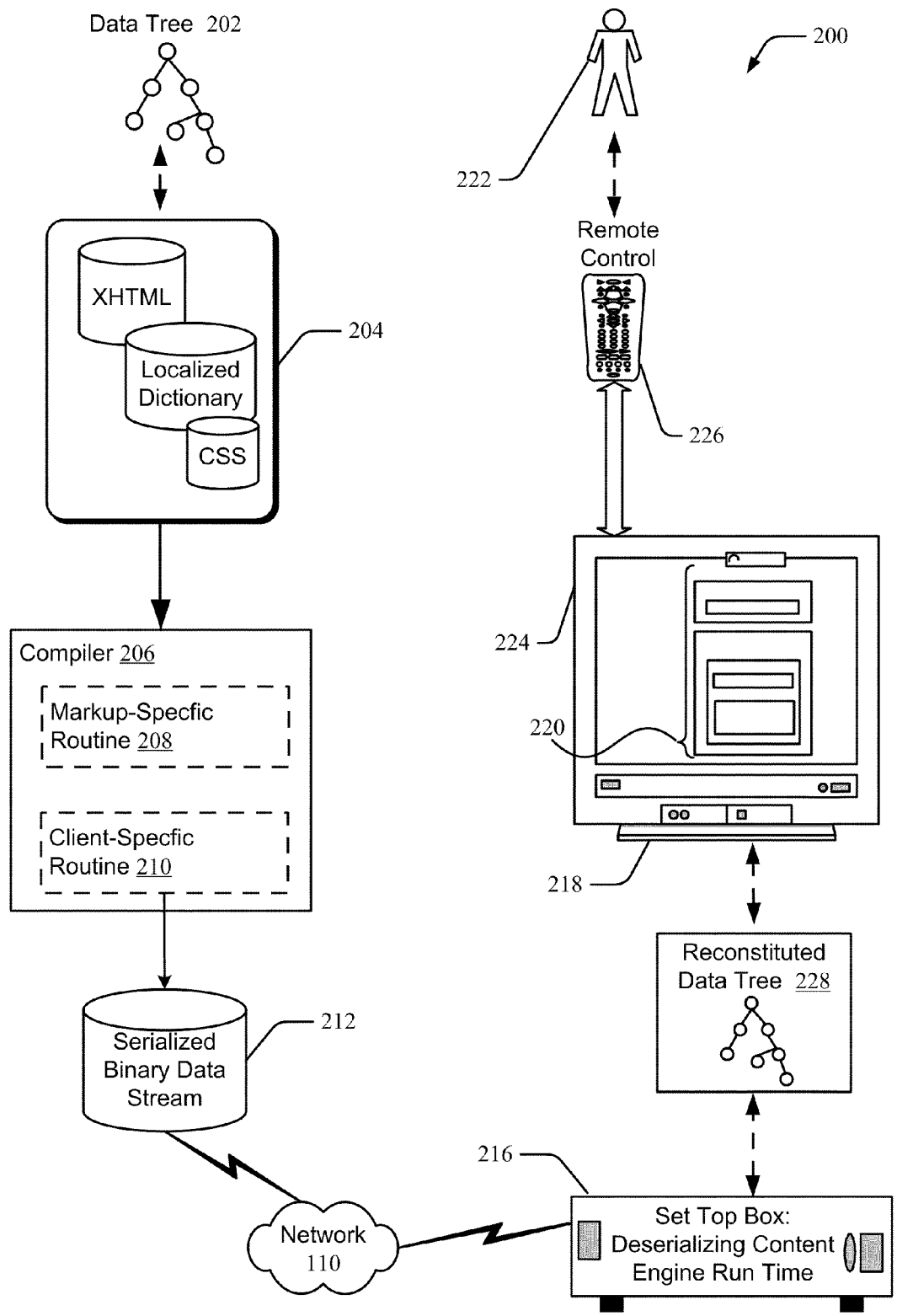
FIG. 2 shows an exemplary process for compiling content expressed in a specific complex markup language into serialized binary data that is rendered at a low-resource client.

FIG. 2 shows an exemplary environment 200 having content 204 stored in a structure as a data tree 202 and expressed in XHTML+CSS. Content 204 further includes words that have been translated from words in the content that were derived from a localized dictionary also shown at reference numeral 204. The content 204 is submitted to a compiler 206 having a markup-specific routine 208 and a client-specific routine 210. The markup-specific routine 208 is configured so as to be compatible with processing XHTML+CSS of content 204. The client-specific routine 210 is configured so as to be compatible with processing output of the markup-specific routine 208 and for outputting a serialized binary bit stream 212 that is compatible for transmission over a network 110 for input and rendering by a set top box 216. Set top box 216 includes a runtime engine to deserialize the serialized binary bit stream 212 and to reconstitute therefrom a data tree 228. Reconstituted data tree 228 includes attributes for the rendering thereof on set-top box 116 as represented by the CSS-styled XHTML of the original content with respect to data tree 202. The hierarchy of reconstituted data tree 228 is reflected in the structure of the rendering 220 on a screen 224 of a display device 218 (e.g., a television). Reconstituted data tree 228 also includes information for dynamic display and interactive response to input from a user 222 via remote control 226, where the information was originally from the content 204.

Cascading Style Sheets (CSS), as used herein, use "selectors" to determine which styles apply to a particular element. When a CSS selector applies to a particular element, the particular element is said to be "selected" by that CSS selector. Some kinds of selectors determine a style for a particular element by the type of the particular element. For instance, the particular element can have a type such as "A", "DIV", "TD", or "H1". Other kinds of selectors determine a style for a particular element by a word from a list of words that are contained in an attribute. By way of example, one such word could be "conifer" as specified in the attribute 'class="tree conifer pine"'. Still other kinds of selectors that determine a style for a particular element can be found by reference to standards set forth by the W3C.

One means by which a CSS selector can apply to, and therefore 'select', a particular element is by a pseudo-class. A pseudo-class is defined for various characteristics such as whether a particular element is a link (e.g., a ":link" pseudo-class), whether a user has used an input device such as a mouse to 'click' on a object corresponding to a particular element (e.g., an ":active" pseudo-class), or whether a cursor for the user's input device is hovering over an object representing a corresponding particular element (e.g., a ":hover" pseudo-class). Other pseudo-classes, as documented by the W3C, offer still further CSS selectors that can apply to a particular element.

There are occasions when different styles may apply to a particular element that is to be processed at a low-resource client. Each such different style will depend upon the current pseudo-class of the particular element or possibly the pseudo-classes of the particular element's preceding siblings or ancestors or the transitive closure of their preceding siblings and ancestors. By way of example, and not by way of limitation, a particular element may be associated with a ":link" pseudo-class so that the particular element will be displayed in the blue color when a user's input device (e.g., the mouse) is not hovering over the particular element, and will be displayed in the red color when the user's input device does hover over the particular element. Due to the low-resources of a low-resource client, including its slow speed and small storage capacity, any cascading of styles at the low-resource client is not practical.

In order to avoid the speed and capacity requirements inherent in the cascading of styles based on pseudo-class, implementations are presented for precomputing the cascaded values (e.g., pre-cascading) of the styles that would apply to each particular element based on different pseudo-class selectors. classes. To do so, each different style based on pseudo-class is gathered together within a binary formatted stream. This gathering of the different styles into a binary stream, prior to transmitting the stream to the low-resource client, enables the low-resource client to avoid the speed and capacity requirements inherent in the cascading of styles based on pseudo-class.

The low-resource client has a receiver to receive a transmission of the binary stream. The binary stream can then be processed by the low-resource client. This processing determines which style, from a list of styles in the binary stream, to apply to a particular element (e.g., to select the particular element) based on the pseudo-classes that are applicable.

A still further example a particular element's association with different pseudo-classes is given by the following documented stylesheet and XHTML fragment, respectively:

Stylesheet:
    a { color: black; } /* the normal state of an "a" element when no pseudo-classes apply */
    a:link { color: blue; } /* selects an "a" element that has an associated link (the href attribute) */
    a:focus {color: yellow; } /* selects an "a" element when it has keyboard focus */
    a:hover {color: red; } /* selects an "a" element when the cursor is over it */
    a:active { color: green; } /* selects an "a" element when it is being activated (a click, for example) */
XHTML fragment:    <a href="Next.html" > Go to next page </a>

Given the foregoing stylesheet and XHTML fragment, suppose that a low-resource client had the capability of supporting the display functions of a focus style upon a particular element and an active style upon the particular element, where each style has a selector. Suppose also that, since the particular element has an "href" attribute, then the simple "a" selector would always be overridden by at least the ":link" selector since the color would never be black. In this case, there would be three (3) styles that would be computed for the particular element for the pseudo-classes supported by the low-resource client. These three computed styles could then be stored for the various pseudo-classes in the binary stream that is to be transmitted to the low-resource client. Once this binary stream has been received at the low-resource client, a content engine at the low-resource client can decode the binary stream. The decoding process will determine that the particular element should be blue if the particular element is not focused, should be yellow if the particular element has focus, and should be green when the particular element is activated.

In summary, cascading is the process of applying a flat list of CSS selectors (each containing a rule and a set of property/value pairs) to an XML/XHTML tree, and generating a fully styled tree. The selectors are conditionally applied to each of one or more nodes in the tree—depending on whether the rule matches the node and also depending on the weight of that selector versus that of any other selectors that would apply. In contrast to cascading, a preliminary cascading (e.g., pre-cascading) of the styles that apply to a particular element based on different pseudo-classes is intended herein to mean a performance of the CSS cascading prior to transmitting (e.g. at the head-end or on the server side). Pre-cascading differs in this example from conventional processing, where the cascading is performed using a client instead of a server, and where cascading must be performed with each change of a document at the client. Examples of where a change of a document occurs at the client include where a window is resized or where the user's input device (e.g., mouse) is moved, etc. In conventional processing when a pseudo-state on a node of a tree changes, the cascade needs to be performed again—starting at the node with the modified pseudo-state in the tree and proceeding down the lineage in the tree to the hierarchically lowest node. Since, however, pre-cascading is disclosed as being performed at the head-end (e.g., at the server side), the process of pre-cascading is performed for all possible pseudo-states from which multiple styles are obtained. These multiple styles are stored at each node in the tree and each style is applied to a particular pseudo-state. As such, the pre-cascade is only performed once for each of the pseudo-states.

Figure 3:
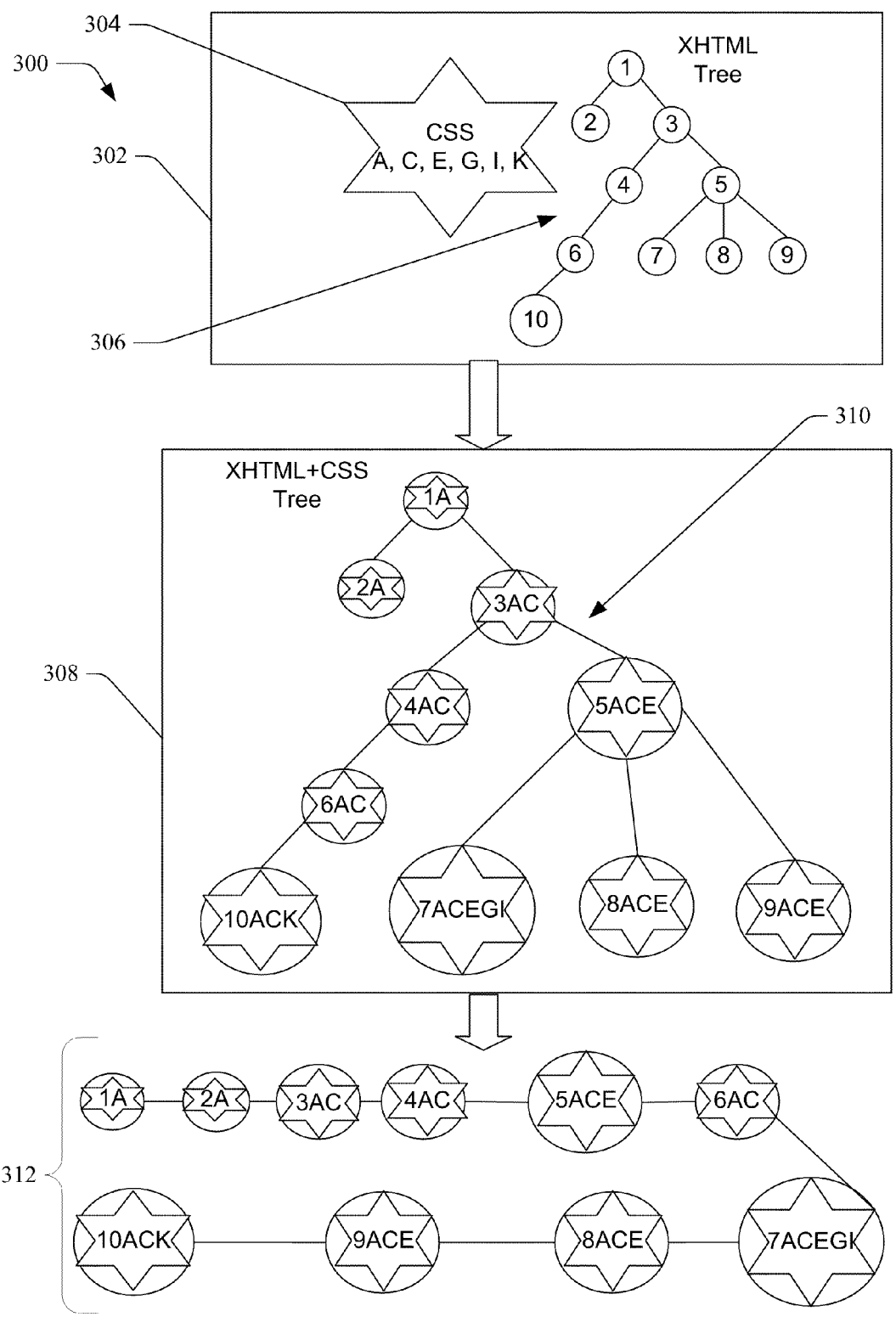
FIG. 3 shows exemplary data structures that can be used in the compilation of content into the serialized binary data that is rendered as in FIG. 2, where parameters, event handlers, and other attributes expressed in XHTML+CSS for corresponding hierarchically arranged nodes are associated into the serialized binary data.

FIG. 3, taken in the context of the foregoing explanation of the process of pre-cascading, shows content 302 that includes exemplary data structures. These data structures include an XHTML tree 306 having nodes 1-10. FIG. 3 also shows Cascading Style Sheets information (CSS) 304 that includes style attributes A, C, E, G, I, and K. As part of a pre-cascading process 300 as illustrated in FIG. 3, a block 308 applies style rules to nodes 1 through 10 of XHTML tree 306 by finding matches of CSS selectors for style attributes A, C, E, G, I, and K to the nodes. An XHTML+CSS tree 310 of block 308 depicts the resulting matches of the CSS selectors of CCS 304 to XHTML tree 306, The XHTML+CSS tree 310 of block 308 shows that the CSS selector for the style rule 'A' is the style rule that applies to node 1 (e.g., '1A'). Node 2, which has no other applicable style rule, gets its styling information from node 1 (e.g., '2A'). The CSS selector for the style rule 'C' is the style rule that applies to node 3, and node 3 also gets styling information from node 1 (e.g., '3AC'). Node 4, which has no other applicable style rule, gets its styling information from node 3 (e.g., '4AC'). The CSS selector for the style attribute 'E' is the style rule that applies to node 5, and node 5 also gets styling information from node 3 (e.g., '5ACE'). Nodes 8 and 9, which have no other applicable style rule, gets their styling information from node 5 (e.g., '8ACE' and '9ACE', respectively). The CSS selector for the style attributes 'G' and 'I' are the style rules that apply to node 7, and node 7 also gets styling information from node 5 (e.g., '7ACEGI').

Node 7 in XHTML+CSS tree 308 has reference to a complete style record. To reduce the amount of data in the binary stream that is transmitted to a client, XHTML+CSS tree 308 demonstrates that some nodes share a "pre-cascaded" style record because the results of matching routine in the pre-cascading process 300 are not unique. The nodes that share a pre-cascaded style record are nodes 1-2, nodes 3, 4, and 6, and nodes 5, 8, and 9. Nodes having unique pre-cascaded style records are nodes 7 and 10. As such, elements corresponding to nodes can end up sharing a "pre-cascaded" style record if the results of "pre-cascading" are not unique.

The CSS 304 provides presentation information for XHTML tree 306 which itself provides structure. "Style" refers, in part, to visual aspects of display elements during a display, such as the color of certain parts of the display, the formatting of certain parts of the display (size, boldface, italics, font, etc.), and so on. The term style also refers to how the display elements in the display behave. For instance, the display may include a collection of different text fields. The behavior of a text field may pertain to whether interactive features will governed by the interactive styles functionality of the CSS 304. For instance, when a user provides input to focus or select a text field, the display may include one appearance for when the text field is focused a different appearance for when it is selected, and yet another appearance for when it is neither focused nor selected. Different interactive styles can be associated with different nodes 1-10 in the display.

Each node 1-10 in XHTML tree 306 is located within a hierarchy of nested nodes. As mentioned above, a parent node in the hierarchy may contain information which identifies the style parameters or event handlers associated with a specified descendant node. In other words, to form the XHTML+CSS tree 310, the specified node can inherit the style parameters and event handlers associated with a parent node in the hierarchy of the XHTML tree 306 by a mechanism for inferring the style parameters and event handlers. Style properties discovered at any node in the XHTML tree 306 often define the style of all nodes linked to this node and lower in the XHTML tree 306's hierarchy (unless overruled by the express associations of such lower nodes).

The same iterative procedure discussed above can be used to determine whether there are any particular interactive event handlers that apply to hierarchically lower nodes of a parent or grandparent node, such an appearance change in a text field upon a focused and/or selected user input event. In this procedure, while the formation of XHTML+CSS tree 310 may not have uniquely associated any event handlers with a particular node, it may nevertheless have assigned one or more event handlers to a parent node in the hierarchy of the XHTML tree 306. The event processing functionality specified by these parent nodes can then be used to define the event processing functionality of subordinate nodes in the XHTML+CSS tree 308 by virtue of inheritance.

The pre-cascading process 300 forms serialized binary data 312 from XHTML+CSS tree 310. By way of example, and not by way of limitation, the process to form serialized binary data 312 can be performed by client-specific routine 108b of FIG. 1 or by compiler 206 of FIG. 2 for forming serialized binary data 312 from content 302. Serialized binary data 312 is compiled and formed so as to include parameters, event handlers, and other attributes expressed in CSS 304 for corresponding hierarchically arranged nodes of the XHTML tree 306. Serialized binary data 312 also includes equivalent words of different languages as are derived, incident to the compilation process, from a localization dictionary for words in the XHTML tree 306.

Figure 4:
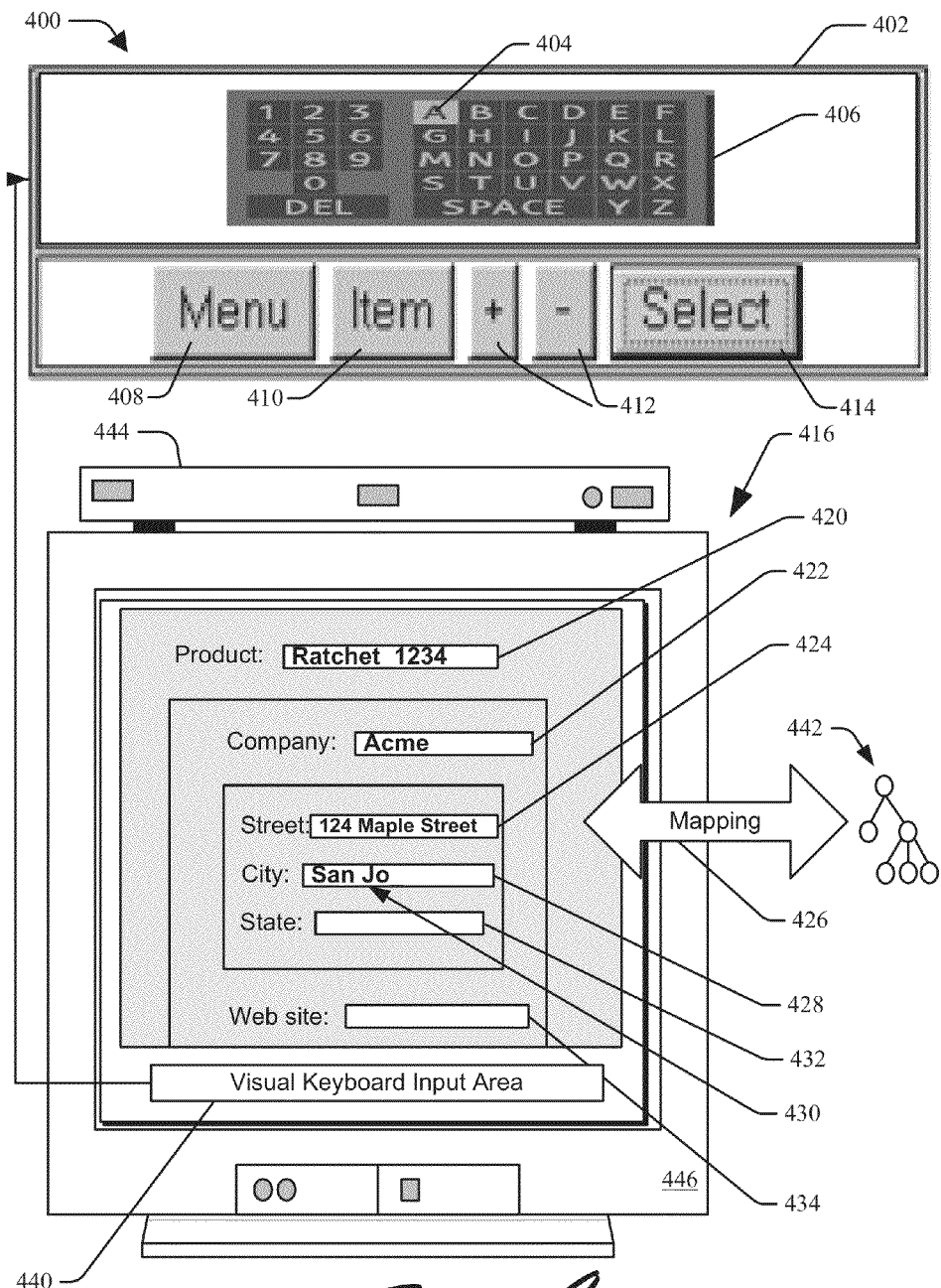
FIG. 4 shows an exemplary environment in which a display device outputs a display of video content from a low-resource client, where the client uses a Document Object Model (DOM) hierarchy that was derived from serialized binary data which had been compiled from the video content as expressed in an original complex markup language, where the DOM hierarchy maps to the display so as to maintain layout, rendering, UI interaction, and dynamic aspects of video content from the original complex markup language, and where the display includes an exemplary menu through which input of selected characters is interactively received.

An exemplary environment 400 in FIG. 4 features a home entertainment system 416 that includes a display device 446 in communication with a set top box 444. Display device 446 outputs a display of video content from set top box 444. The set top box executes a DOM hierarchy that was derived from serialized binary data which had been compiled from the video content as expressed in an original complex markup language. The serialized binary data was received from a headend (not shown). The set top box 444 uses the DOM hierarchy that maps to the display on display device 446 so as to maintain layout, rendering, UI interaction, and dynamic aspects of video content from the original complex markup language. The display includes an exemplary menu 402 through which one of a plurality of characters 406 can be focused upon and interactively selected for input to set top box 444. By way of example, the original complex markup language can include attributes of each character 406 when an input device is used to focus upon the character as shown by the appearance of focused character 404. The focus attribute for the appearance of focused character 404 is in then compiled into the serialized binary stream.

Examples of various commands that can be selected by a user's use of an input device are seen in menu screen 402 as displayed in a user interface. The display on display device 446 shows a practical example of the use of menu screen 402 by a user to select from among characters 406 for input into fields shown on the display. A user can use an input device to virtually depress virtual buttons 412 to move the focus forward and backward through a displayed hierarchical list of the available alphabetic, numeric, and symbolic images in characters 406. A character that is focused upon, such as the focused character 404 seen in menu 402, can be selected when the user virtually depresses the virtual selection button 414. As such, the user can focus and select one of the fields 420-434, as well as the focus and input of a sequence of characters 406, by respectively depressing virtual buttons 412 and 414 to thereby move forward and backward through the sequence of fields 420-434 and characters 406 for respective selections. The menu screen 402 can appear on the display at a visual keyboard display area 440. When a virtual menu button 408 is virtually depressed on menu screen 402, the user will see a transition back to a different display the context of which can be stored in the set-top box 444 or can be retrieved from a headend upon a demand for same that is initiated by the activation of the virtual menu button 408. Other virtual buttons on the visual keyboard display area 440 are also contemplated in order to provide for the initiation of other or additional functions by the user.

The fields 420-434 are included in an exemplary displayed form into which the user may make input using focused selections of characters 406 from menu 402. The fields are included in an exemplary form on the UI that is being used by a user to make text entries. For instance, the user is currently entering text into the text field 428 at open area 430.

Figure 5:
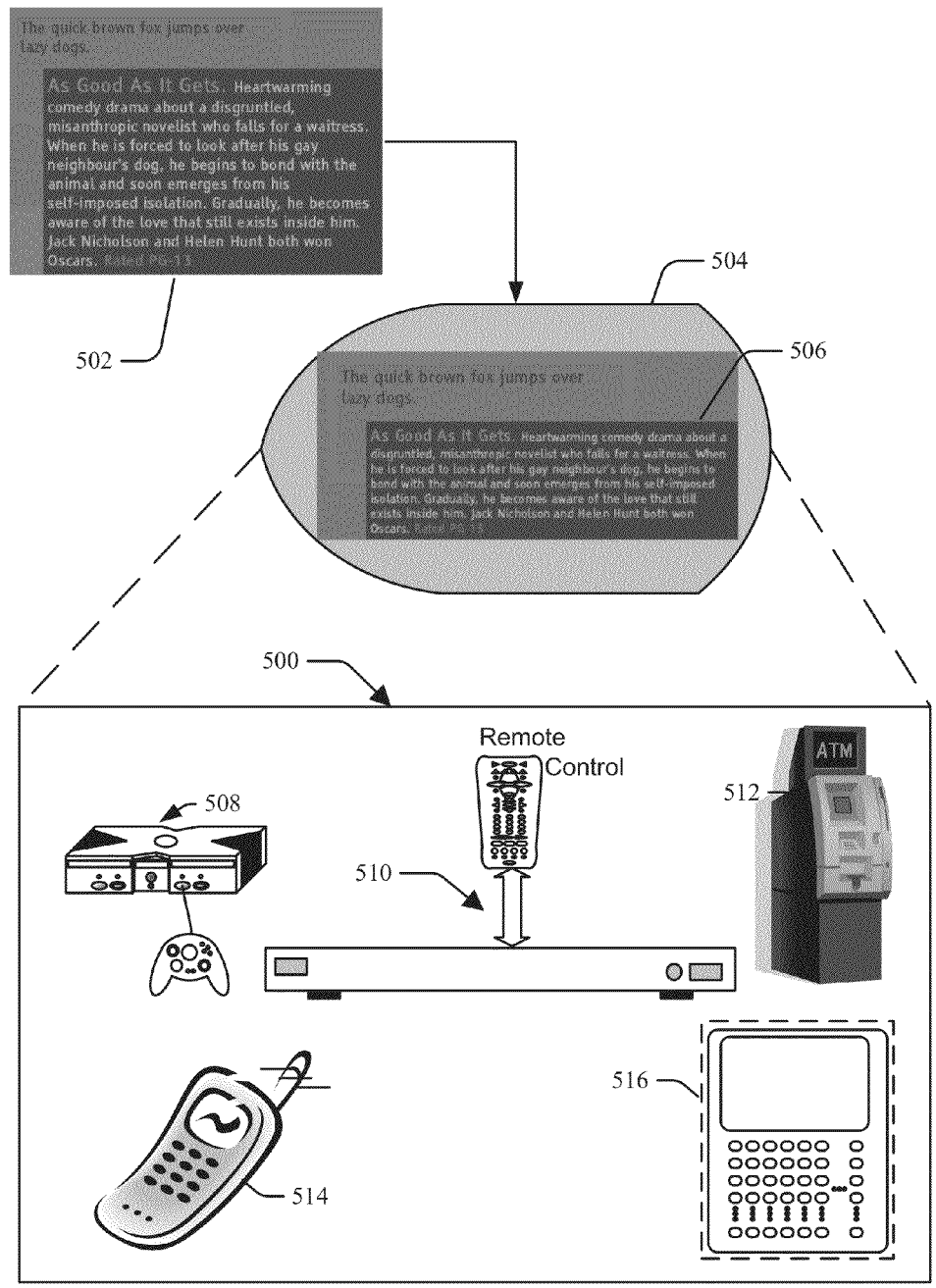
FIG. 5 shows a plurality of exemplary low-resource clients each of which can execute an application to render video content by using a DOM hierarchy that was derived from serialized binary data which had been compiled from the video content as expressed in an original complex markup language, where the video content is rendered on a display of the low-resource client, where the video content from the original markup language includes text and a shape within which the text is to be placed on the display, and where the text is reflowed within the shape consistent with the resolution and size of the display.

Several exemplary low-resource clients are seen in FIG. 5 at a region 500. Region 500 includes a video game console 508, a home entertainment device 510 that includes a set-top box with a remote control, an Automatic Teller Machine (ATM) 512, and a Personal Digital Assistance (PDA) 516 having communications capability. Each low-resource client in region 500 can execute an application to render video content by using a DOM hierarchy that was derived from serialized binary data which had been compiled from the video content as expressed in an original complex markup language. An exemplary screen 504 for each low-resource client is seen in FIG. 5. Video content 502 from the original markup language includes text and a shape within which the text is to be placed on the display 504. As seen by the difference between video content 502 and the display 506 of screen 504, each low-resource client has the capability of using the DOM hierarchy to reflow the text within the shape consistent with the resolution and size of the screen 504. The reflow operation is accommodated by the DOM hierarchy without retrieving additional content from a server or other distributor of content. As such, authors of content written in complex markup languages, such as XHTML+CSS, need not write various versions of the content for different sized screens to accommodate textual reflows when, as described herein, the content is formed into serialized binary data and processed by a run time engine on the low-resource client.

B. Exemplary Implementation of Exemplary Process

Figure 6:
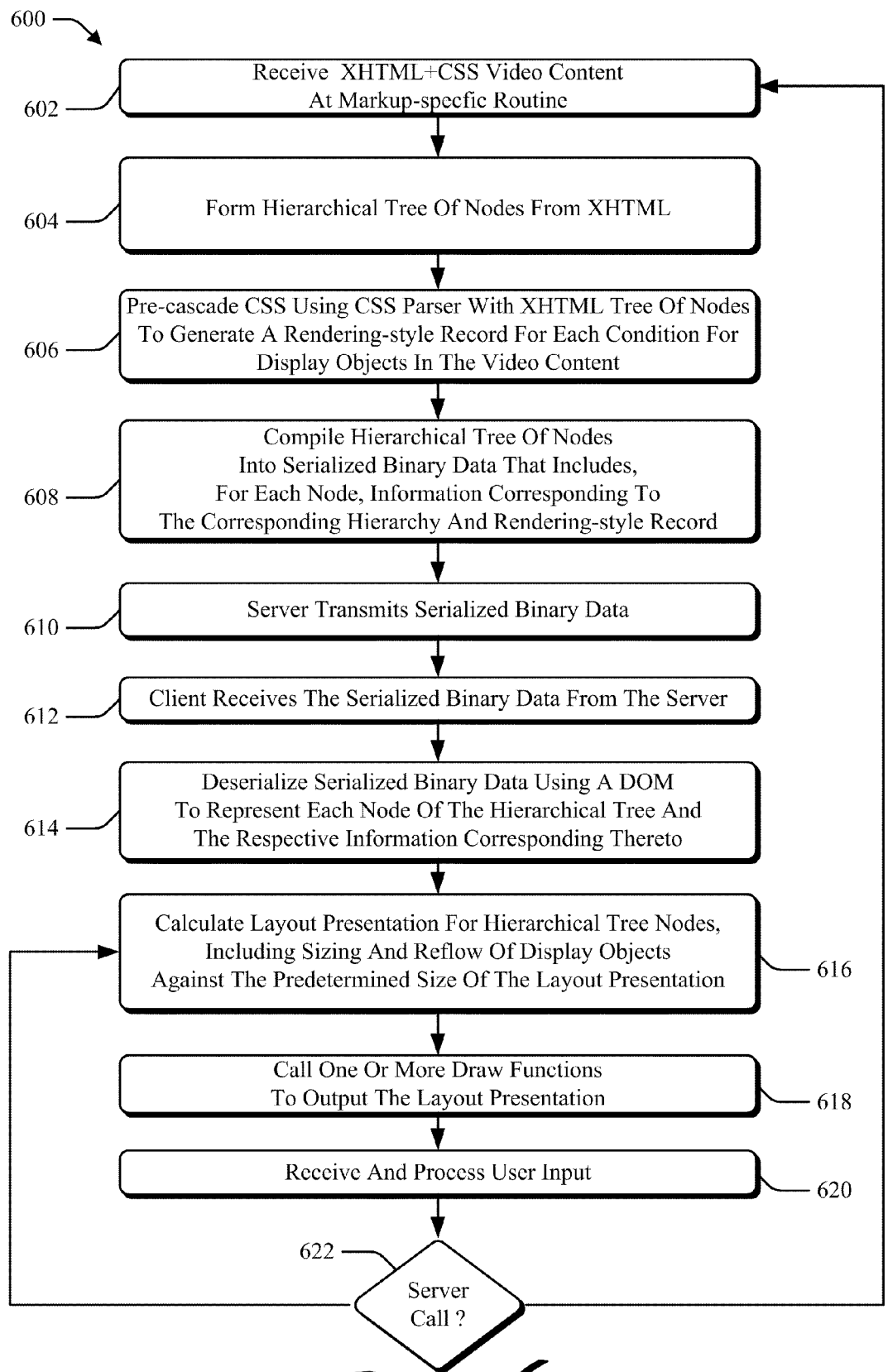
FIG. 6 illustrates an exemplary process for compiling content expressed in XHTML+CSS using a markup-specific routine that is specific to the XHTML+CSS, where the compiling also uses a routine that is specific to a particular low-resource client to form serialized binary data that is rendered at the low-resource client, and where the rendering preserves the richness of the content expressed in the XHTML+CSS.

An exemplary process 600 is seen in FIG. 6 according to one implementation. At block 602, video content is received at a server-side of a headend for a MultiSystem Operator (MSO). The video content, which is written in a complex markup language such as XHTML and CSS, is delivered to a markup-specific routine of a compiler. At block 604, the compiler pre-cascades the parsed CSS with the XHTML to generate one or more rendering-style records. The video content includes a plurality of display objects. Each display object has one or more conditions. A rendering-style record is generated at block 604 for each condition of each display object, where one or more types of interactive input can be the condition upon which the rendering-style record for a display object is generated.

At block 606 of process 600 a hierarchical tree of nodes is formed from parsing the structure in the XHTML file. Each node in the hierarchical tree is referenced to a corresponding rendering-style record, created during the pre-cascading of the CSS. To reduce the amount of rendering-style records, only one such record is created and referenced to nodes having the same style, thereby eliminating the duplication of rendering-style records.

A block 608, the hierarchical tree of nodes is compiled by a client-specific routine into serialized binary data that includes, for each node, information corresponding to the hierarchy and rendering-style record thereof. The client-specific routine can be preconfigured to generate the serialized binary data for a specific low-resource client that will render a substantial equivalent of the original video content from the serialized binary data.

At block 610, the server-side of the headend transmits the serialized binary data over a network. Examples of such a network include, but are not limited to, a cable television broadcasting network, a cellular telephone network, a satellite television broadcasting network, a terrestrial analog or digital television broadcasting network, a local area network (LAN), a wide area network (WAN), and/or the Internet.

At block 612, the low-resource client receives the serialized binary data from the network and then, at block 614, deserializes the serialized binary data using a DOM to represent each node of the hierarchical tree and the respective information corresponding thereto. This hierarchical tree matches and derives its structure from the original XHTML file. At block 616, a calculation is made of a layout presentation for the nodes of the hierarchical tree. The calculations for the presentation include sizing and reflow of the plurality of display objects against a predetermined size of the layout presentation. By way of example, and not by way of limitation, a set top box can be set up or configured when put into service for a television having a screen that is a particular size and resolution.

At block 618, a call is made to one or more draw functions to output the calculated layout presentation. The user can then use an input device to provide input to a user interface associated with the calculated layout presentation. At block 620, the input is received and processed. If the input requires the sending and/or retrieval from the server-side of the headend at the MSO, as determined by a query at block 622, then control for process 600 moves to block 602 for a repetition of the foregoing blocks, otherwise, process 600 moves to block 616 for the performance blocks 616-620 as described above.

While process 600 has been described in the context of content written in XHTML+CSS, other content model contents can also be used. Although the distribution of content is described with respect to the server-side of a headend in process 600, other network resources are also contemplated that are capable of sending content that has been compiled from a markup language into serialized binary data. While the low-resource client for process 600 has been described with respect to a set top box, process 600 is also applicable for other low-resource clients, such as are seen in region 500 of FIG. 5.

C. Exemplary Computing Environment

Figure 7:
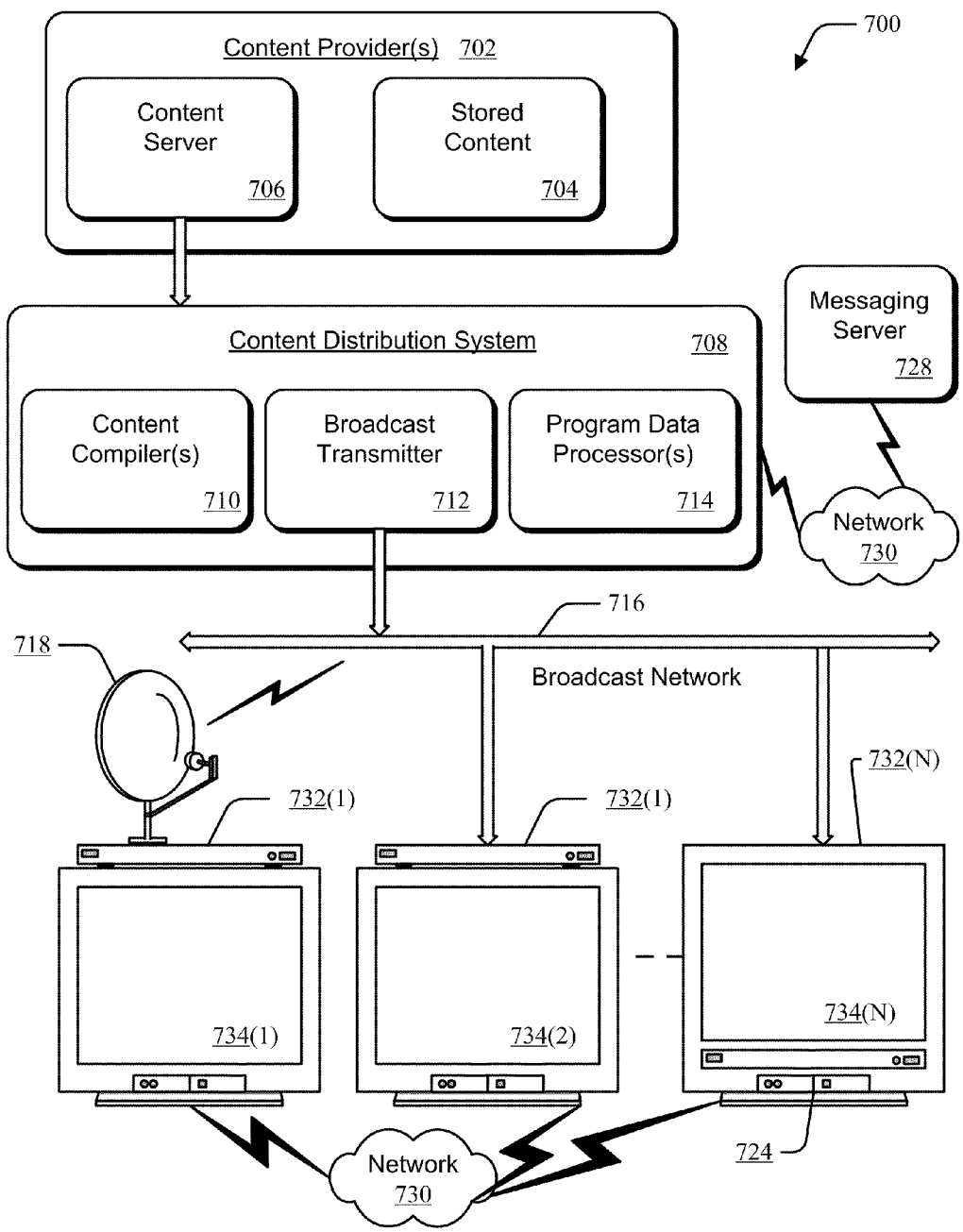
FIG. 7 illustrates an exemplary system that provides a suitable operating environment in which the present invention can be either fully or partially implemented, and more particularly showing a content distribution system that is broadcasting to a plurality of low-resource client devices, where both the content distribution system and each client device are in communication with a two-way network.

FIG. 7 illustrates an exemplary environment 700 in which the present invention can be fully or partially implemented. Exemplary environment 700 is a television entertainment system that facilitates distribution of content and program data to multiple viewers. The environment 700 includes one or more content providers 702, a content distribution system 708, and multiple client devices 732(1), 732(2), . . . , 732(N) coupled to the content distribution system 708 via a broadcast network 716.

Content provider 702 includes a content server 706 and stored content 704, such as movies, television programs, commercials, music, and similar audio and/or video content. Content server 706 controls distribution of the stored content 704 from content provider 702 to the content distribution system 708. Additionally, content server 706 controls distribution of live content (e.g., content that was not previously stored, such as live feeds) and/or content stored at other locations to the content distribution system 708.

Content distribution system 708 includes a broadcast transmitter 712, one or more content compilers 710, and one or more program data processors 714. Each content compiler 710 includes a markup-specific routine and a client-specific routine corresponding, respectively, to content model-specific transcoder 106a and client-specific routine 108a of FIG. 1. Broadcast transmitter 712 broadcasts signals, such as cable television signals, across broadcast network 716. Broadcast network 716 can include a cable television network, RF, microwave, satellite, and/or data network, such as the Internet, and may also include wired or wireless media using any broadcast format or broadcast protocol. Additionally, broadcast network 716 can be any type of network, using any type of network topology and any network communication protocol, and can be represented or otherwise implemented as a combination of two or more networks.

Content compilers 710 compatibility processes the content received from content provider 702 prior to transmitting the content across broadcast network 716. A particular content compiler 710 compatibly encodes, or otherwise processes, the received content into a format that is understood by the multiple client devices 732(1), 732(2), . . . , 732(N) coupled to broadcast network 716. Although FIG. 7 shows a single content provider 702 and a single content distribution system 708, exemplary environment 700 can include any number of content providers coupled to any number of content distribution systems. Content distribution system 708 is representative of a headend service that utilizes a carousel file system to repeatedly broadcast to client devices 732 over broadcast network 716.

Client devices 732 can be implemented in a number of ways. For example, a client device 732(1) receives broadcast content from a satellite-based transmitter via satellite dish 718. Client device 732(1) is also referred to as a set-top box or a satellite receiving device. Client device 732(1) is coupled to television 734(1) for presenting the content received by the client device (e.g., audio data and video data), as well as a graphical user interface. A particular client device 732 can be coupled to any number of televisions 734 and/or similar devices that can be implemented to display or otherwise render content. Similarly, any number of client devices 732 can be coupled to a single TV 734.

Client device 732(2) is also coupled to receive broadcast content from broadcast network 716 and provide the received content to associated television 734(2). Client device 732(N) is an example of a combination television and integrated set-top box. In this example, the various components and functionality of the set-top box are incorporated into the television, rather than using two separate devices. The set-top box incorporated into the television may receive broadcast signals via a satellite dish (similar to satellite dish 718) and/or via broadcast network 716. In alternate implementations, client devices 732 may receive broadcast signals via a two-way network 730, such as the Internet, or any other broadcast medium. Each client device 732 can execute an application to deserialize and render serialized binary data received from a broadcast network 716, in a manner discussed above with respect to content engine 114 of the client 112 seen in FIG. 1.

Also included in environment 700 are one or more network devices, such as a messaging server 728, that communicate with content distribution system 708 and with client devices 732 (1-N) through interconnected network 730, such as the Internet. Interconnected network 730 allows two-way communication between client devices 732 (1-N) to messaging server 728. This communication allows client devices 732 (1-N) and/or messaging server 728 to transmit addressed messages over interconnected network 730. Each message can itself contain a message that is addressed to a network resource, such as to an email address at an email server, to a Web site address of a web site on the Internet, to facsimile telephone number of a facsimile machine on a telephone network, or as is conventional with other message delivery modalities. By way of example, and not by way of limitation, a viewer can use the client device 732, or a personal computer or other network device to log on to network 730, such as the Internet, and to communicate with messaging server 728 or other network resource so as to locate any message that has been sent.

The messaging server 728 can be a network service, such as a Web hosting service, that stores data about any client device 732 or its respective viewer. The viewer can keep data at messaging server 728 that can in turn be accessed by other Web hosting services on the Internet where the viewer has permitted such access, which may be of a limited nature. An example of such a data provider is the Microsoft Network (MSN) of the Microsoft Corporation of Redmond, Wash. MSN provides a .NET™ PASSPORT® service that, among other services, stores data that can be retrieved by other Web services on the Internet that are compatible with the .NET™ PASSPORT® service. In this example, the viewer can submit various contact information to messaging server 728. These contact information can be one or more addresses to which messages are to be sent.

Figure 8:
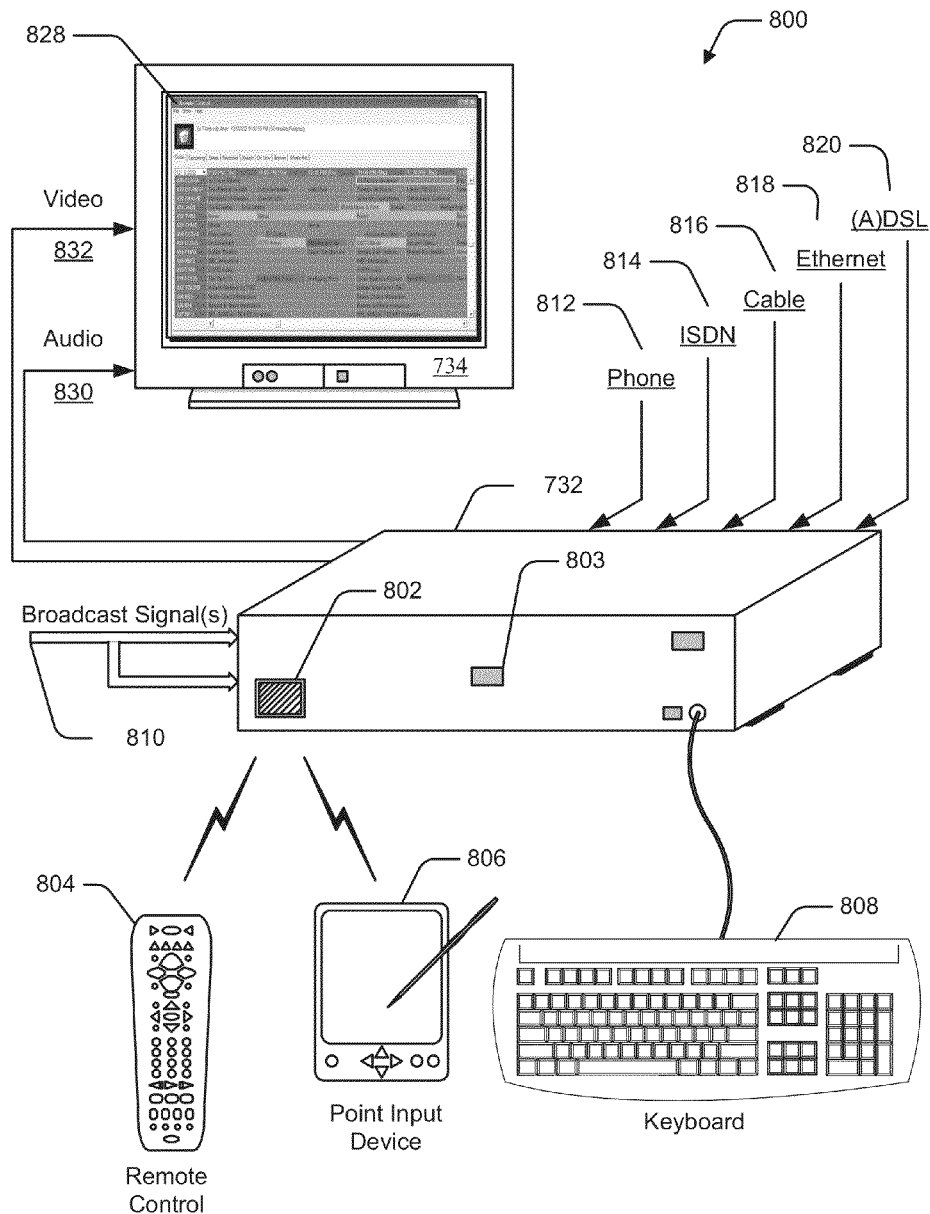
FIG. 8 illustrates an example client device, a television, and various input devices that interact with the client device.

FIG. 8 illustrates an exemplary implementation 800 of a client device 732 shown as a standalone unit that connects to a television 734 that displays a display 828 on a screen. Client device 732 can be implemented in any number of embodiments, including as a set-top box, a satellite receiver, a TV recorder with a hard disk, a video game console, an information appliance, and so forth. Client device 732 includes a wireless receiving port 802, such as an infrared (IR) or Bluetooth wireless port, for receiving wireless communications from a remote control device 804, a handheld input device 806, or any other wireless device, such as a wireless keyboard. Handheld input device 806 can be a personal digital assistant (PDA), handheld computer, wireless phone, or the like. Additionally, a wired keyboard 808 can be coupled to communicate with the client device 732. In alternate embodiments, remote control device 804, handheld device 806, and/or keyboard 808 may use an RF communication link or other mode of transmission to communicate with client device 732.

Client device 732 receives one or more broadcast signals 810 through from one or more broadcast sources, such as from a satellite or from a broadcast network. Client device 732 includes hardware and/or software for receiving and decoding broadcast signal 810, such as an NTSC, PAL, SECAM or other TV system video signal. Client device 732 also includes hardware and/or software for providing the viewer with a graphical user interface by which the viewer can, for example, access various network services, and perform other functions.

Client device 732 is capable of communicating through interconnected network 730 seen in FIG. 7 with other devices via one or more connections including a conventional telephone link 812, an ISDN link 814, a cable link 816, an Ethernet link 818, an ADSL and/or DSL link 820, and the like. Client device 732 may use any one or more of the various communication links 812-820 at a particular instant to communicate with any number of other devices and/or to establish a two-way communication with one or more network resources via network 730 seen in FIG. 7.

Client device 732 generates video signal(s) 832 and audio signal(s) 830, both of which are communicated to television 734. The video signals and audio signals can be communicated from client device 732 to television 734 via an RF (radio frequency) link, S-video link, composite video link, component video link, or other communication link. At reference numeral 803 in FIG. 8, client device 732 includes one or more lights or other request IDs identifying the current status of the device or for diagnostic reports to a viewer. Additionally, the client device may include one or more control buttons, switches, or other selectable controls for controlling operation of the device. A diagnostic visual and/or audible alarm device or mechanism at reference numeral 803 can emit a diagnostic representative of a system message so that the viewer may be warned visually and/or audibly.

Figure 9:
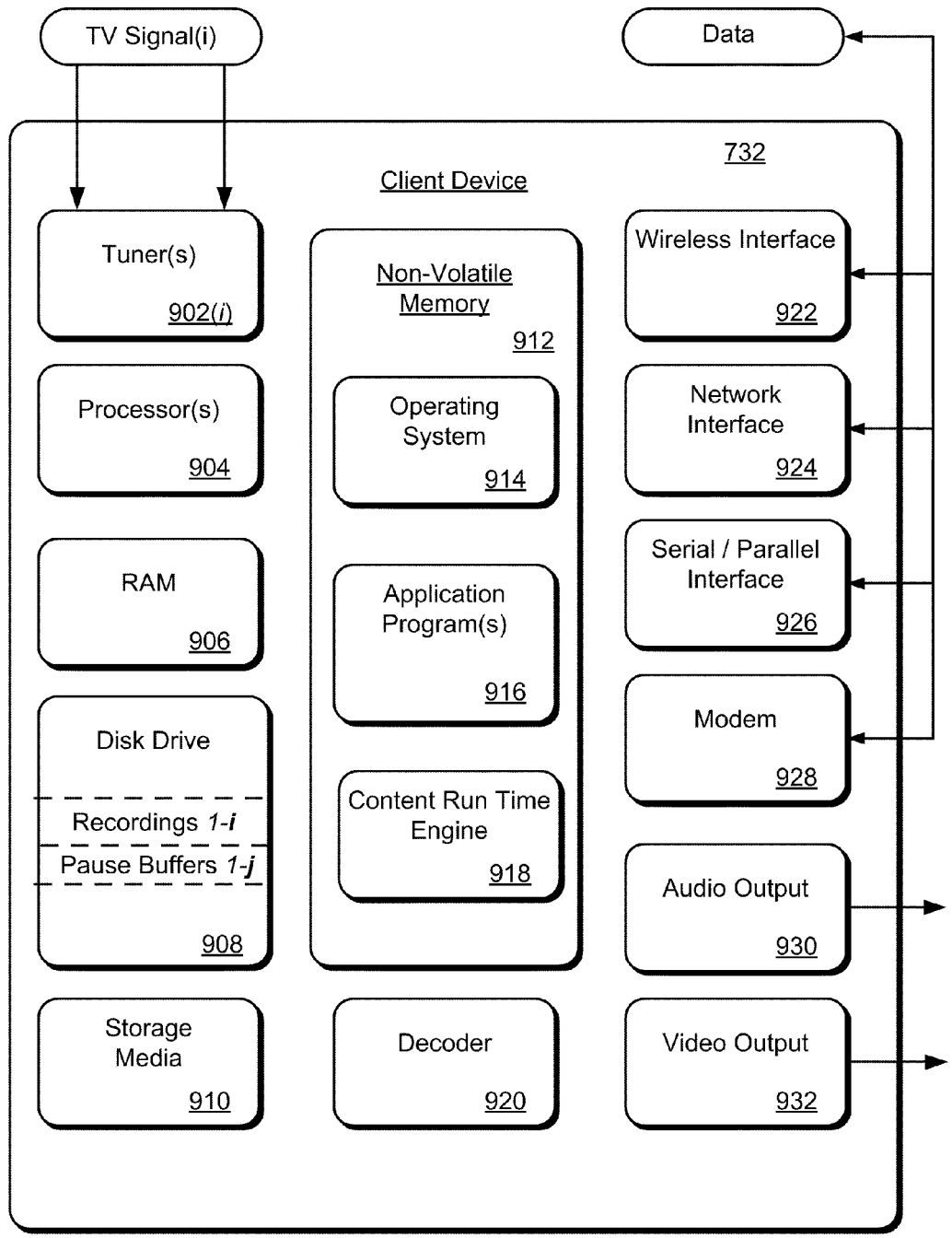
FIG. 9 is a block diagram that illustrates components of the exemplary client device(s) shown in FIGS. 7-8.

FIG. 9 illustrates selected components of client device(s) shown in FIGS. 2, 4, 5 and 7-8. Client device 732 shown in FIG. 9 includes one or more tuners 900(*i*). Tuners 900(*i*) are representative of one or more in-band tuners that tune to various frequencies or channels to receive television signals, as well as an out-of-band tuner that tunes to the broadcast channel over which electronic programming guide (EPG) data is broadcast to client device 732.

Client device 732 also includes one or more processors 904 and one or more memory components. Examples of possible memory components include a random access memory (RAM) 906, a disk drive 908, a mass storage component 910 such as a tape in a tape drive or removable media component in a removable media drive, and a non-volatile memory 912 (e.g., ROM, Flash, EPROM, EEPROM, etc.). Disk drive 908 can have one or a plurality of audiovisual recordings (i) and one or a plurality of pause buffers (j) stored thereon. A TV program database can be stored on disk drive 908 to keep an electronic programming guide (EPG) that is communicated to the client device 732 in a broadcast. Recordings (i), pause buffers (j), and the TV program database can also be stored in one or more other memory devices at client device 732, such as in non-volatile memory 912, RAM 906, and/or storage media 910. Alternatively, recordings (i), pause buffers (j), and the TV program database can also be stored remote from client device 732 at a network resource in communication with client device 732 through interconnected network 730 seen in FIG. 7.

Alternative implementations of client device 732 can include a range of processing and memory capabilities, and may include more or fewer types of memory components than those illustrated in FIG. 9. For example, full-resource clients can be implemented with substantial memory and processing resources, including a disk drive 908 to store content for replay by the viewer. Low-resource clients, however, may have limited processing and memory capabilities, such as a limited amount of RAM 906, no disk drive 908, and limited processing capabilities. Nevertheless it is intended that client device 732 can include a capability for video recording, either locally or remotely from client device 732.

Processor(s) 904 process various instructions to control the operation of client device 732 and to communicate with other electronic and computing devices. The memory components (e.g., RAM 906, disk drive 908, storage media 910, and non-volatile memory 912) store various information and/or data such as content, EPG data, configuration information for client device 732, and/or graphical user interface information.

An operating system 914 and one or more application programs 916 may be stored in non-volatile memory 912 and executed on processor 904 to provide a runtime environment. A runtime environment facilitates extensibility of client device 732 by allowing various interfaces to be defined that, in turn, allow application programs 916 to interact with client device 732. In the illustrated example, a content run time engine 918, functionally like content engine 114 as shown in FIG. 1, is stored in memory 912 to operate on serialized binary data as disclosed herein.

Reports can be output from client device 732, as well as other communications, which can be communicated in a one or two-way communication through interconnected network 730 see in FIG. 7. These communications can be made with various network resources using network interface 924, wireless interface 922, serial/parallel interface 926, modem 928, or other well known communication hardware/software algorithms and protocol for computing devices.

The application programs 916 that may be implemented at client device 732 include a browser to browse the Web so as to view diagnostics at a Web site, an electronic mail (email) program to facilitate email to transmit message emails to an email address, a facsimile transmission program to initiate a facsimile transmission to a facsimile machine through phone line 712 seen in FIG. 9 so as to send a facsimile message with respect to client device 732, a Short Message Service (SMS) transmission program to initiate a transmission of a text message with respect to client device 732 to a mobile pager on a page channel, and so on.

Client device 732 can also include other components pertaining to a television entertainment system which are not illustrated in this example for simplicity purposes. For instance, client device 732 can include a user interface application and user interface lights, buttons, controls, etc. to facilitate viewer interaction with the device.

Client device 732 also includes a decoder 920 to decode a broadcast video signal, such as an NTSC, PAL, SECAM or other TV system video signal. Alternatively, a decoder for client device 732 can be implemented, in whole or in part, as a software application executed by processor(s) 904. Wireless interface 922 allows client device 732 to receive input commands and other information from a viewer-operated input device, such as from a remote control device or from another infrared (IR), Bluetooth, or similar RF input device.

Network interface 924 and serial and/or parallel interface 926 allows client device 732 to interact and communicate with other electronic and computing devices via various communication links. Although not shown, client device 732 may also include other types of data communication interfaces to communicate with other devices. Modem 928 facilitates client device 732 communications with other electronic and computing devices via a conventional telephone line. Components seen at reference numerals 916 and 922-928 facilitate applications where client device 732 has Internet access or communicates data on a two-way network.

Client device 732 also includes an audio output 930 and a video output 932 that provide signals to a television or other device that processes and/or presents or otherwise renders the audio and video data. Although shown separately, some of the components of client device 732 may be implemented in an application specific integrated circuit (ASIC). Additionally, a system bus (not shown) typically connects the various components within client device 732. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is been made herein to one or more client devices, such as client device 732. As used herein, "client device" means any electronic device having data communications, data storage capabilities, and/or functions to process signals, such as broadcast signals, received from any of a number of different sources.

Client device 732 can include a variety of computer readable media identified as communication media. Communication media typically embodies computer readable instructions, data structures, program modules, or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

In a networked environment, such as that illustrated with computing environment 100 seen in FIG. 7, program modules or portions thereof, may be stored in a remote memory storage device. By way of example, application programs 916 and content run time engine 918 may reside on a memory device of a remote computer and/or server. For purposes of illustration, FIG. 9 shows the application programs 816 and content run time engine 918 in illustrated discrete blocks, although it is recognized that such programs and components reside at various times in different storage components of the client device 732, and are executed by the processor(s) 904 of the client device 732.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:
1. A server-side for a headend, comprising:
one or more processors;
one or more computer storage media storing computer-executable instructions that, when executed, cause one or more processors to:
compute style rules for a plurality of elements of video content in an original markup language to define pseudo-classes which preserve a dynamic layout, presentation, rendering, and user interface interaction of a plurality of elements of the content;
parse the video content in an original markup language into a Document Object Model (DOM) tree based on the style rules and the pseudo-classes that includes layout, rendering, user interface (UI) interaction, and dynamic aspects of the video content; and transcode the DOM tree via a selected client-specific routine that is specific to a particular client and a markup-specific routine that is specific to a content model into a serialized byte-stream of the video content, the serialized byte-stream of video content including the style rules and a list of the pseudo-classes to preserve preserving the layout, rendering, UI interaction, and dynamic aspects of the video content of the video content on the predetermined client in the original markup language; and a network interface coupled to the one or more processors to communicate the serialized byte-stream.

2. The server-side for a headend as recited in claim 1, wherein the original markup language comprises eXtensible Hypertext Markup Language (XHTML) and Cascading Style Sheets (CSS).

3. The server-side for a headend as recited in claim 1, wherein the video content in the original markup language includes video content in one or more formats being at least one of a word processing document format, a spreadsheet format, a slideshow format, a database format, a drawing format, or an electronic mail (email) format.

4. The server-side for a headend as recited in claim 1, wherein the network interface communicates the serialized byte-stream to a predetermined client.

5. A system comprising:
one or more processors;
one or more computer storage media for storing instructions, which when executed by the one or more processors, cause the one or more processors to:
compute style rules for a plurality of elements of an original markup language video content to define pseudo-classes which preserve a dynamic layout, presentation, rendering, and user interface interaction of a plurality of elements of the content;
transcode the plurality of elements and the style rules into a binary format video content with a document object model hierarchy via a routine specific to a predetermined client, the binary format video content including a list of the pseudo-classes for preserving a layout, rendering, user interface (UI) interaction, and dynamic aspect of the original markup language video, wherein the document object model hierarchy includes nodes having pre-cascaded style rules; and
a network interface to communicate the binary format video content for presentation over a network to the predetermined client.

6. The system as recited in claim 5, wherein:
the original markup language video content includes inline images and first shape within which the inline images are to be placed; and
the binary format video content is presented at the predetermined client such that the inline images are placed within a second shape consistent with a display resolution and size of the predetermined client, the first shape being different from the second shape.

7. The system as recited in claim 5, wherein the binary format video content is presented at the predetermined client in a manner that preserves the layout, rendering, UI interaction, and dynamic aspects of the original markup language video content.

8. The system as recited in claim 7, wherein the binary format video content is presented at the predetermined client using a form element, scrolling, navigation, and event handling as recited in the original markup language video content.

9. The system as recited in claim 5, wherein the network is at least one of:
a cable television broadcasting network;
a satellite television broadcasting network;
a cellular telephone network;
a terrestrial analog or digital broadcasting television network;
a local area network (LAN);
a wide area network (WAN); or
an Internet.

10. The system as recited in claim 5, wherein the system is a server at a headend of a MultiSystem Operator.

11. The system as recited in claim 5, wherein the binary format video content includes one or more nodes.

12. The system as recited in claim 11, wherein one or more elements of the binary format video content that have similar styling are rendered based on a same node of the one or more nodes.

13. The system as recited in claim 5, wherein the original markup language video content is in a format being at least one of an original markup language, a word processing document format, a spreadsheet format, a slideshow format, a database format, a drawing format, or an electronic mail (email) format.

14. One or more computer storage media storing computer-executable instructions that, when executed, cause one or more processors to perform acts comprising:
compiling content in a complex markup language via a routine specific to a predetermined client to define pseudo-classes which preserve a dynamic layout, presentation, rendering, and user interface interaction of a plurality of elements of the content;
encoding the content to serialized binary data, the serialized binary data including the plurality of elements and a list of the pseudo-classes; and
presenting the serialized binary data including the dynamic layout, presentation, rendering, and user interface interaction by selecting particular elements of the plurality of elements based on the list of the pseudo-classes.

15. The one or more computer storage media as recited in claim 14, the computer-executable instructions causing the one or more processors to perform acts further comprising forming a Document Object Model (DOM), the DOM including the pseudo-classes.

16. The one or more computer storage media as recited in claim 14, the computer-executable instructions causing the one or more processors to perform acts further comprising transmitting the serialized binary data to the predetermined client.

17. The one or more computer storage media as recited in claim 16, wherein the presenting presents the serialized binary data at the predetermined client.

18. The one or more computer storage media as recited in claim 17, wherein the predetermined client is at least one of a set-top box, a personal computer, a video game console, an automatic teller machine, a cellular telephone, or a computing device having processor hardware with a clock speed of less than twenty (20) MHz and having memory less than two (2) megabytes.

19. The one or more computer storage media as recited in claim 14, wherein the content in the complex markup language includes content in one or more formats being at least one of an original markup language, a word processing document format, a spreadsheet format, a slideshow format, a database format, a drawing format, or an electronic mail (email) format.

20. The one or more computer storage media as recited in claim 14, wherein the content in the complex markup language comprises eXtensible Hypertext Markup Language (XHTML) and Cascading Style Sheets (CSS).

* * * * *